United States Patent
McGilliard

(10) Patent No.: US 8,832,805 B1
(45) Date of Patent: Sep. 9, 2014

(54) VERIFYING USER INFORMATION

(75) Inventor: Christopher L. McGilliard, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/205,214

(22) Filed: Aug. 8, 2011

(51) Int. Cl.
  *G06F 17/30* (2006.01)
  *G06F 15/16* (2006.01)
(52) U.S. Cl.
  USPC ............................ 726/5; 713/185; 726/28
(58) Field of Classification Search
  None
  See application file for complete search history.

(56) References Cited

U.S. PATENT DOCUMENTS

| | | | | |
|---|---|---|---|---|
| 5,602,933 | A * | 2/1997 | Blackwell et al. | 382/116 |
| 5,642,160 | A * | 6/1997 | Bennett | 348/156 |
| 6,119,932 | A * | 9/2000 | Maloney et al. | 235/380 |
| 6,557,105 | B1 * | 4/2003 | Tardo et al. | 713/193 |
| 7,114,079 | B1 * | 9/2006 | Cook et al. | 713/186 |
| 7,865,439 | B2 * | 1/2011 | Seifert et al. | 705/44 |
| 7,911,655 | B2 * | 3/2011 | Hatzav et al. | 358/474 |
| 8,539,607 | B2 * | 9/2013 | Lu et al. | 726/29 |
| 8,539,609 | B2 * | 9/2013 | Kurokawa | 726/30 |
| 2003/0154138 | A1 * | 8/2003 | Phillips et al. | 705/26 |
| 2003/0163708 | A1 * | 8/2003 | Tang | 713/185 |
| 2003/0215114 | A1 * | 11/2003 | Kyle | 382/115 |
| 2004/0091136 | A1 * | 5/2004 | Dombrowski | 382/115 |
| 2006/0173792 | A1 * | 8/2006 | Glass | 705/75 |
| 2006/0173793 | A1 * | 8/2006 | Glass | 705/75 |

OTHER PUBLICATIONS eBay et al "eBay Requests for Proof of Identity and Ownership of Items" pp. 1-8, Dec. 11, 2010, Wayback Machine for http://pages.ebay.co.uk/help/account/verification_request.html.*

* cited by examiner

*Primary Examiner* — Kaveh Abrishamkar
*Assistant Examiner* — James J Wilcox
(74) *Attorney, Agent, or Firm* — Hope Baldauff, LLC

(57) ABSTRACT

A computer is configured to impose an access restriction based upon user-provided information, such as a user's birthdate. In order to enforce such a restriction, the computer requests from a user an image of a valid identity document associated with the user, such as a valid driver's license. In response to receiving such an image from the user, the computer performs an image analysis on the image to extract user information. The computer might extract the user's name, address, birthdate, driver's license number, and/or other information from the image for instance. The computer may utilize the extracted information to determine whether the user should be granted access. The computer may determine based upon the extracted information, for instance, whether the age of the user is greater than a minimum age required to access the computer. The computer may be configured to restrict access to a Web site in this manner.

16 Claims, 7 Drawing Sheets

VERIFYING USER INFORMATION

BACKGROUND

World Wide Web ("Web") sites frequently require visiting users to be a minimum age. In order to enforce a minimum age requirement, many Web sites will ask a visiting user to specify their birthdate prior to granting the user access to the Web site. The user is permitted to access the Web site if the birthdate provided by the user indicates that the user is older than the minimum age required for access.

Most Web sites do not perform any verification on the birthdate information provided by users. Rather, most Web sites that enforce a minimum age requirement typically trust users to enter their actual birthdates. The lack of verification of birthdate information, however, makes it very easy for underage users to gain access to Web sites that they should not be permitted to access.

It is with respect to these and other considerations that the disclosure made herein is presented.

DETAILED DESCRIPTION

Figure 1:
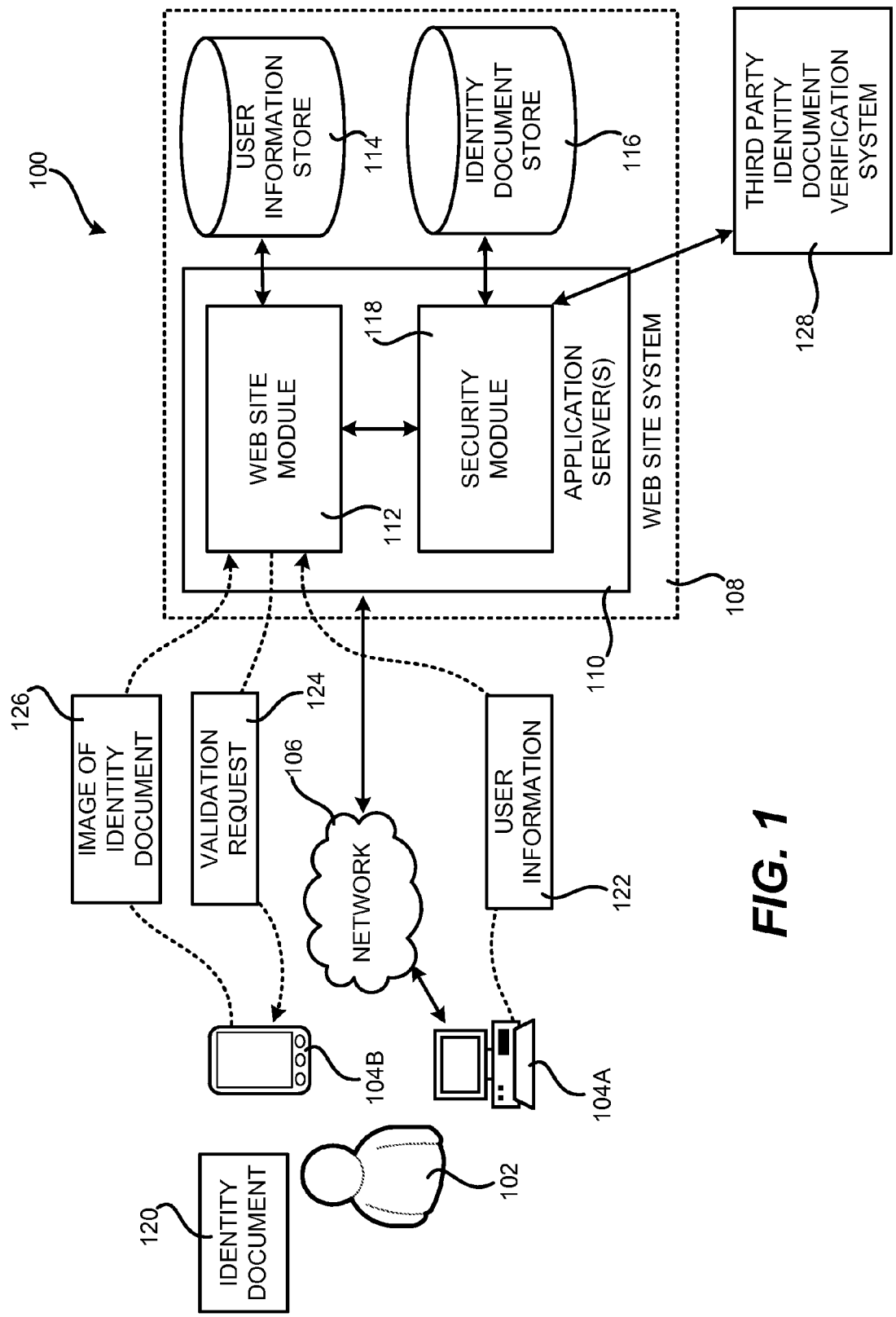
FIG. 1 is a system diagram showing aspects of one mechanism disclosed herein for verifying user information.

The following detailed description is directed to technologies for verifying user information. Utilizing the concepts and technologies disclosed herein, a user's birthdate and/or other personal user information can be verified through an analysis of an image of an identity document associated with the user, such as a driver's license or passport. Through the use of such a mechanism, some attempts to circumvent a minimum age requirement imposed by a Web site may be thwarted.

According to aspects presented herein, a Web site is configured to impose a restriction on accessing the Web site based upon user information. For instance, a Web site may be provided that is configured to impose a minimum age restriction upon users of the Web site. In order to impose such a restriction, the Web site is configured to request and receive user information in response to receiving a request from the user to access the Web site. For instance, the Web site may require each user to provide a name, address, birthdate, and/or other user information.

Following the receipt of the user information, the Web site transmits a validation request to a device associated with the user. The validation request may be a request for the user to provide an image of a valid identity document associated with the user, such as a valid driver's license, passport, government issued identification card, or other type of identity document that includes pertinent user information. The validation request may be transmitted to a wireless mobile telephone associated with the user utilizing a Short Message Service ("SMS") message or in another manner.

The user may respond to the validation request by providing an image of an identity document. For instance, the user might utilize their mobile telephone to create an image of their driver's license and to submit the image to the Web site. In response to receiving the image, the Web site is configured to perform an image analysis on the image to extract user information from the image. For instance, the Web site might extract the user's name, address, birthdate, driver's license number, and/or other information from the image. Once the user information has been extracted from the image, the Web site compares the extracted user information to the user information provided by the user. The user is then granted access to the Web site if the information matches and if the information indicates that the user is older than the minimum age required for access to the Web site. If the information does not match or if the information indicates that the user is not older than the minimum age, then the user may be denied access to the Web site or access may be restricted in some fashion.

According to another aspect, the user may be requested to submit an image showing both the user (i.e. the user's face) and a valid identity document that includes an image of the user (e.g. a photo identification containing a photo of the user) in response to the validation request. In response to receiving such an image, the Web site is configured to perform an image analysis on the image to extract a portion of the image showing the user and a second portion of the image showing the user in the identity document. The Web site then compares the two extracted portions of the image to determine if the user is shown in the identity document. If so, and if the user meets the minimum age requirements for the Web site, then the user may be granted access to the Web site. Otherwise the user may be denied access to the Web site or access to the Web site might be restricted in some way.

According to another aspect, the user information extracted from an image of an identity document provided by a user may be transmitted to a third party identity document verification system for validation. For instance, the extracted information may be transmitted to a system operated by a federal, state, or local government that provides functionality for verifying identity documents such as driver's licenses. The third party system may verify the provided user information and return a response to the Web site indicating the results of the verification. If the user information is not valid, the user will not be permitted access to the Web site or access to the Web site might be restricted.

According to another aspect, a validation request may include a request for a user to initiate a video stream that includes an image of a valid identity document. For instance, the user may be requested to initiate a video session using a Web camera or the camera of a wireless mobile telephone and to show a valid identity document in the video. An additional level of security might be provided by performing a live verification of an identity document in a video stream as compared to verification based upon a static image of an identity document. In this embodiment the Web site is configured to extract an image of an identity document from the video stream and to extract user information, like the user's name, address, and birthdate, from the image. The extracted information can then be validated by comparing the information to user-supplied information, by transmitting the information to a third party identity document verification system, and/or in another manner. The user might also be requested to show both themselves (i.e. the user's face) and a valid identity document that includes an image of the user (e.g. a photo identification containing a photo of the user) in the video. The Web site may analyze such an image to determine if the user is shown in the identity document.

Although the embodiments presented herein are described primarily in the context of verifying user information in conjunction with a request to access a Web site, it should be appreciated that the embodiments disclosed herein might also be utilized with other types of computers, computing systems, devices, application programs, operating systems, or other types of systems or components that require the verification of user-related information, such as a birthdate. It should also be appreciated that while the embodiments described herein are presented primarily in the context of enforcing a minimum age restriction on users of a Web site, the embodiments disclosed herein may also be utilized to impose a maximum age restriction or another type of restriction that is based upon user-related information. For instance, and without limitation, the embodiments disclosed herein might be utilized to impose a restriction on users of a Web site or other computing system based upon geography, based upon citizenship of a state or country, and/or residency. In these embodiments, a geographical location may be extracted from an image of an identity document (e.g. the city, state, or country of residence) and utilized to determine if access to a Web site or other type of computing system may be granted. Accordingly, although the embodiments disclosed herein are primarily presented in the context of a Web site that embodies the concepts disclosed herein to impose a minimum age restriction, the disclosure presented herein is not limited to such an implementation.

It should be also appreciated that the subject matter presented herein may be implemented as a computer process, a computer-controlled apparatus, a computing system, or an article of manufacture, such as a computer-readable storage medium. These and various other features will become apparent from a reading of the following disclosure and a review of the associated drawings.

While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will appreciate that the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, electronic book readers, wireless telephone devices, special-purposed hardware devices, network appliances, or the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

FIG. 1 and the following description are intended to provide a brief, general description of a suitable computing environment in which the embodiments described herein may be implemented. In particular, FIG. 1 is a system and network diagram that shows an illustrative operating environment 100 including several software components for verifying user information. As discussed above, the environment 100 is merely illustrative and the embodiments disclosed herein might be utilized in many different types of environments.

The environment 100 includes a user 102 that utilizes one or more user devices 104A-B to access a Web site system 108 through a network 106. In the example shown in FIG. 1, the user device 104A is a desktop computer and the user device 104B is a wireless mobile telephone, such as a smartphone. It should be appreciated, however, that the user 102 might utilize other types of mobile and non-mobile devices to access the Web site system 108, such as a workstation, laptop computer, tablet computer, notebook computer, personal digital assistant ("PDA"), electronic-book reader, game console, set-top box, consumer electronics device, server computer, or any other type of computing device capable of connecting to the network 106 and communicating with the Web site system 108.

The network 106 may be a local-area network ("LAN"), a wide-area network ("WAN"), the Internet, or any other wired or wireless networking topology known in the art that connects the user device 104 to the Web site system 108. The Web site system 108 may include a number of application servers 110 that provide a Web site to the user devices 104A-B over the network 106. The user 102 may use a client application (not shown) executing on the user devices 104A-B to access and utilize the Web site provided by the application servers 110.

In one embodiment the client application is a World Wide Web ("Web") browser application, such as the MOZILLA® FIREFOX® Web browser from MOZILLA FOUNDATION of Mountain View, Calif. The Web browser application exchanges data with the application servers 110 in the Web site system 108 using the hypertext transfer protocol ("HTTP") over the network 106. The client application might also be a stand-alone client application configured for communicating with the application servers 110. The client application might also utilize any number of communication methods known in the art to communicate with the Web site system 108 and/or the application servers 110 across the network 106, including remote procedure calls, SOAP-based Web services, remote file access, proprietary client-server architectures, and the like.

The application servers 110 may execute a number of modules in order to provide a Web site and the other functionality disclosed herein to the user devices 104A-B. The modules may execute on a single application server 110 or in parallel across multiple application servers in the Web site system 108. In addition, each module may consist of a number of subcomponents executing on different application servers 110 or other computing devices in the Web site system 108. The modules may be implemented as software, hardware, or any combination of the two.

According to one embodiment, a Web site module 112 executes on the application servers 110. The Web site module 112 provides a Web site to the user devices 104A-B. The Web site may be any type of site, such as a shopping site, a social networking site, a news or information site, a photo or video-sharing site, or another type of Web site.

According to embodiments, the Web site system 108 requires the user 102 to create an account prior to utilizing the Web site provided by the Web site module 112. As part of the account creation process, the Web site module 112 might require the customer to provide user information 122, such as a name, address, birthdate, contact information, credit card information, and/or other types of user information. The Web site module 112 might also require the user 102 to provide credentials, such as a username and password. The Web site module 112 may store the user information provided by the user 102 in a user information store 114.

As will be described in greater detail below, the Web site module 112 might restrict access to the Web site based upon the user provided information, such as a minimum age restriction. For instance, the Web site module 112 might require that the user 102 be at least eighteen years old to access the Web site. The Web site module 112 might also impose other types of access restrictions based upon the user information 122, such as a maximum age requirement, a geographical restriction, or another type of restriction.

According to one embodiment, the Web site module 112 operates in conjunction with a security module 118 to enforce the restrictions described herein. In other embodiments, the Web site module 112 or another component or system might perform this functionality. As will be described in greater detail below, the security module 118 is configured to verify information provided by the user 102 utilizing an image 126 of an identity document 120. An identity document 120 is a document that can be utilized to verify the identity of the user 102. Identity documents may include, but are not limited to, driver's licenses, passports, government-issued photo identification cards, university identification cards, social security cards, and other types of photo and non-photo identification cards or documents.

In the embodiment shown in FIG. 1, the security module 118 is configured to cause a validation request 124 to be transmitted to a user device in response to receiving the user information 122. For instance, in this example the user information 122 has been submitted by way of the user device 104A and the validation request 124 has been transmitted to the user device 104B. As mentioned above, the user device 104B is a wireless mobile telephone in one embodiment. In this embodiment, the validation request 124 is a text message sent utilizing a SMS system. It should be appreciated that the device 104B might also be a tablet computing device, an e-reader device, another type of mobile device, a set top box, or another type of computing device altogether. Also, it should be appreciated that the validation request 124 need not be sent to a second device. For instance, in another embodiment the Web site provided by the Web site system 108 might ask the user 102 to upload an image 126 of the identity document 120 through the user device 104A.

In one embodiment the validation request 124 is a request for the user 102 to submit an image 126 of a valid identity document 120 to the Web site system 108. The user 102 may respond to the validation request 124 by providing an image 126 of an identity document 120. For instance, the user 102 might utilize the user device 104B to create an image of their driver's license and to submit the image 126 of the driver's license to the Web site system 108.

In response to receiving the image 126, the security module 118 is configured to perform an image analysis on the image 126 to extract user information from the image 126. For instance, the security module 118 might extract the user's name, address, birthdate, driver's license number, and/or other information from the image. In order to extract the user information from the image 126, the security module 118 might utilize pre-stored data that describes the format and layout of various types of identity documents 120. For instance, an identity document store 116 might be utilized that includes data describing the format, layout, contents, and other information relevant to driver's licenses issued by the 50 U.S. states. Other types of information and image processing techniques might be utilized in order to extract user information from the image 126.

The information stored in the identity document store 116 might also be utilized in embodiments to verify that the identity document 120 is a valid identity document. For instance, the data stored in the identity document store 116 regarding the format and layout of identity documents might be utilized to verify that the format and layout of the identity document 120 is correct. If the format and/or layout of the identity document 120 is incorrect, the user 102 might be prohibited from using the identity document 120 to gain access to the Web site provided by the Web site system 108. The third party identity document verification system 128 might also be utilized in embodiments to verify that the identity document 120 is a valid identity document.

Once the user information has been extracted from the image 126, the security module 118 compares the extracted user information to the user information 122 provided by the user 102. The user 102 is then granted access to the Web site system 108 if the information matches and if the information satisfies any access restrictions imposed by the Web site system 108. For instance, in one embodiment the user 102 will be granted access to the Web site system 108 if the extracted user information indicates that the user 102 is older than a minimum age required for access to the Web site. If the information does not match or if the information does not satisfy the access restrictions, then the user 102 may be denied access to the Web site or access may be restricted in some fashion.

According to another aspect, the user 102 may be requested to submit an image showing both the user 102 (i.e. the user's face) and an image 126 of a valid identity document 120 that includes an image of the user 102 (e.g. a photo identification containing a photo of the user) in response to the validation request 124. In response to receiving such an image 126, the security module 118 is configured to perform an image analysis on the image 126 to extract a portion of the image showing the user 102 and a second portion of the image showing the user 102 in the identity document 120. The security module 118 then compares the two extracted portions of the image 126 to determine if the user 102 is the same person that is shown in the identity document 120. If so, and if the user 102 meets the minimum age requirements for accessing the Web site system 108, then the user 102 may be granted access to the Web site. Otherwise the user 102 may be denied access to the Web site or access to the Web site might be restricted in some way.

According to another aspect, the user information extracted from the image 126 of the identity document 120 provided by the user 102 may be transmitted to a third party identity document verification system 128 for validation. For instance, the security module 118 may transmit the extracted information to a system 128 operated by a federal, state, or local government that provides functionality for verifying identity documents such as driver's licenses. The third party system 128 may verify the provided user information and return a response to the security module 118 indicating the results of the verification. If the user information is not valid, the user 102 will not be permitted access to the Web site or access to the Web site might be restricted.

Figure 2:
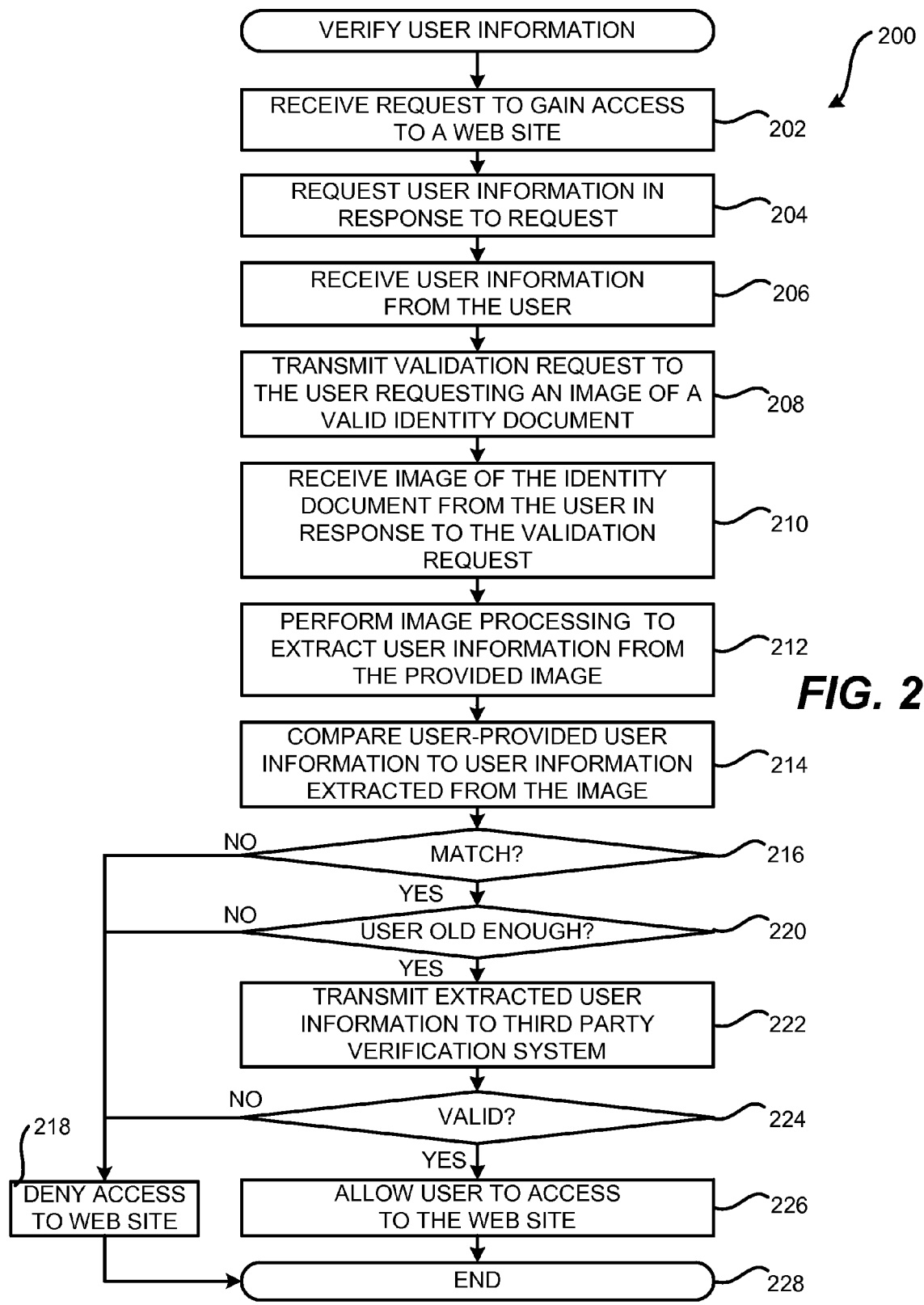
FIG. 2 is a flow diagram illustrating aspects of the mechanism for verifying user information described with reference to FIG. 1.

Turning now to FIG. 2, additional details will be provided regarding the embodiments described herein for verifying user information. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein with reference to the various FIGURES are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIG. 2 is a flow diagram illustrating aspects of the mechanism for verifying user information described with reference to FIG. 1. In particular, FIG. 2 shows a routine 200 that illustrates aspects of the operation of the Web site module 112 for verifying user information according to the embodiment described above with reference to FIG. 1. The routine 200 begins at operation 202, where the Web site module 112 receives a request from a user device 104A to access the Web site provided by the Web site module 112 and the Web site system 108. In response thereto, the Web site module 112 might request that the user 102 provide the user information 122 at operation 204. As mentioned above, the user information 122 might include a user's name, address, birthdate, telephone number, and/or other personal information. The Web site module 112 receives the user information 122 at operation 206. The Web site module 112 may pass the user information 122 to the security module 118 for verification.

In response to receiving the user information 122, the security module 118 causes a validation request 124 to be transmitted to the user 102 at operation 208. For instance, as discussed above, the security module 118 might cause an SMS message containing the validation request 124 to be transmitted to another user device 104B, such as a wireless mobile telephone associated with the user 102. The validation request 124 requests that the user 102 provide an image 126 of a valid identity document 120 that can be utilized to verify the user information 122. The validation request 124 might also be transmitted to another device 104 associated with the user and in another manner.

At operation 210, the security module 118 receives the image 126 of the identity document 120 from the user 102. In response thereto, the routine 200 proceeds to operation 212, where the security module 118 performs image processing on the image 126 to extract user information from the image 126. As mentioned above, the security module 118 might utilize information describing the layout and contents of the identity document 120 and other image processing techniques known in the art to perform this operation. The routine 200 proceeds from operation 212 to operation 214 once the user information has been extracted from the image 126.

At operation 214, the security module 118 compares the user information 122 provided by the user 102 to the user information extracted from the image 126 of the identity document 120. If the information does not match, the routine 200 proceeds from operation 216 to operation 218 where the user 102 is denied access to the Web site provided by the Web site system 108. Alternately, the user 102 may be permitted access to the Web site but the user's access might be restricted in some way.

The routine 200 proceeds from operation 216 to operation 220 if the user information 122 provided by the user 102 matches the user information extracted from the image 126. At operation 220, the security module 118 determines whether the user information extracted from the image 126 meets the access restrictions imposed by the Web site. For instance, the security module 118 may compute the age of the user 102 based upon a birthdate extracted from the image 126 and determine whether the user 102 is old enough to access the Web site. If not, the routine 200 proceeds from operation 220 to operation 218 where the user 102 is denied access to the Web site provided by the Web site system 108 or access might be restricted in some way. If the user 102 meets the access restrictions, the routine 200 proceeds from operation 220 to operation 222.

At operation 222, the security module 118 transmits the user information extracted from the image 126 to the third party identity document verification system 128 for verification. Alternately, the security module 118 may transmit the image 126 to the third party identity document verification system 128 for verification. In response thereto, the security module 118 receives an indication as to whether the identity document 120 shown in the image 126 is valid.

If the third party system 128 indicates that the identity document 120 is not valid, the routine 200 proceeds to operation 218 where the user 102 is denied access to the Web site provided by the Web site system 108 or access might be restricted in some fashion. If the third party system 128 indicates that the identity document 120 is valid, the routine 200 proceeds to operation 226, where the user 102 is granted access to the Web site provided by the Web site system 108. The routine 200 then proceeds to operation 228, where it ends.

It should be appreciated that the operations performed by the security module 118 at operations 216, 220, and 224 described above might be performed in combination as described above, or might be performed individually. Other types of verification operations might also be performed. For instance, as discussed above, the user 102 might also be requested to show both themselves (i.e. the user's face) and a valid identity document 120 that includes an image of the user (e.g. a photo identification containing a photo of the user) in the image 126. The security module 118 may analyze the image 126 to determine if the user 102 is the same person shown in the identity document 120. If not, access to the Web site may be denied to the user 102.

Figure 3:
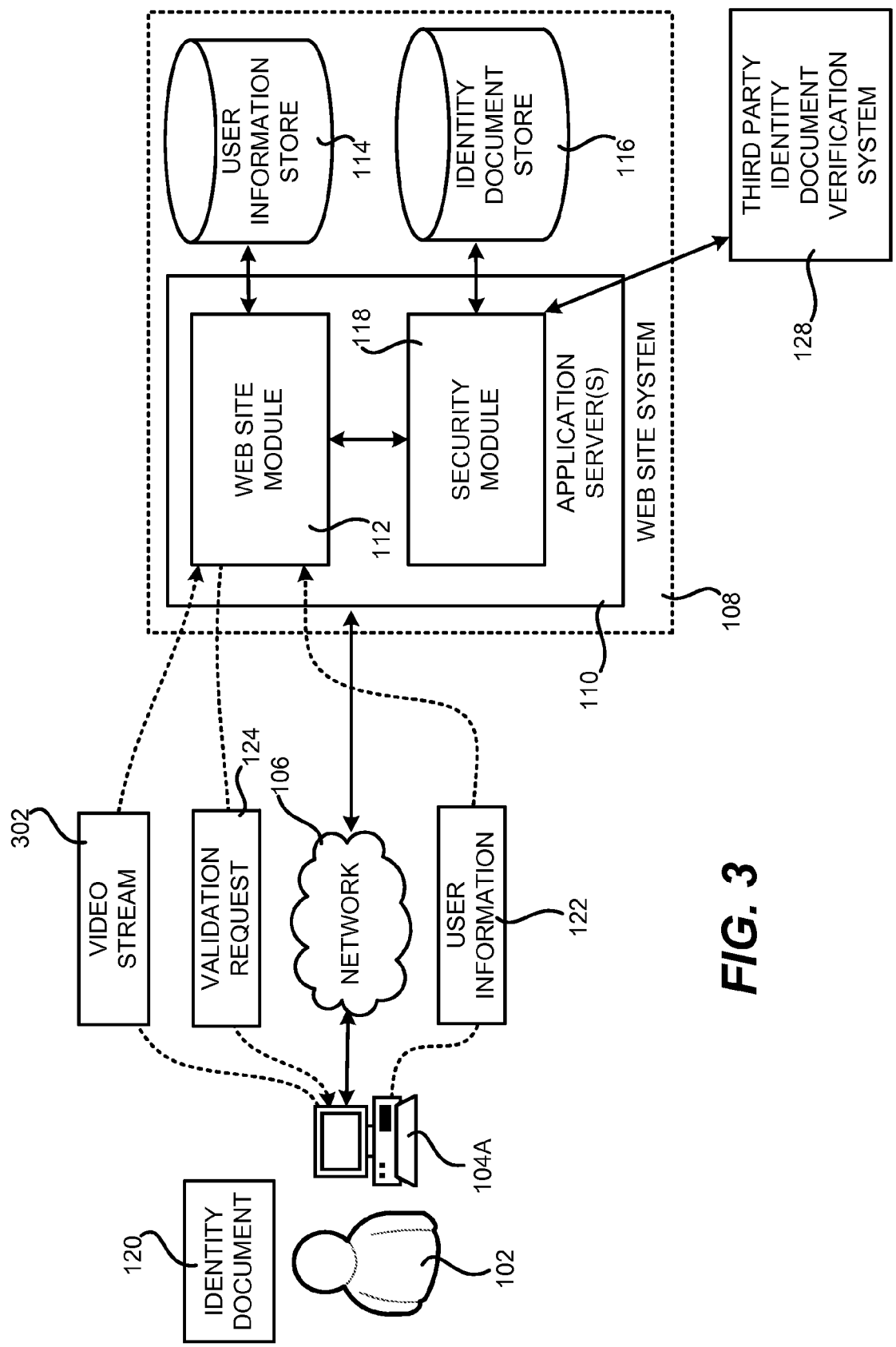
FIG. 3 is a system diagram showing various aspects of another mechanism disclosed herein for verifying user information.

FIG. 3 is a system diagram showing various aspects of another mechanism disclosed herein for verifying user information. In this embodiment, the validation request 124 requests that the user provide a video that includes an image 302 of a valid identity document 120. For instance, the user 102 may be requested to participate in a video chat session between the user device 104A and the Web site system 108 using a Web camera or the camera of a wireless mobile telephone to show a valid identity document 120 in the video.

In this embodiment the security module 118 is configured to extract an image of an identity document 120 from the video stream 302 provided by the user device 104A. The security module 118 is also configured to extract user information, like the user's name, address, and birthdate, from the image. The extracted information can then be validated by comparing the information to user-supplied information in the manner described above with regard to FIG. 1, by transmitting the information to a third party identity document verification system 128 in the manner described above, and/or in another manner.

The user 102 might also be requested to show both themselves (i.e. the user's face) and a valid identity document 120 that includes an image of the user (e.g. a photo identification containing a photo of the user) in the video stream 302. The security module 118 may analyze such an image to determine if the user is shown in the identity document in a similar manner to that described above with regard to FIG. 1.

Figure 4:
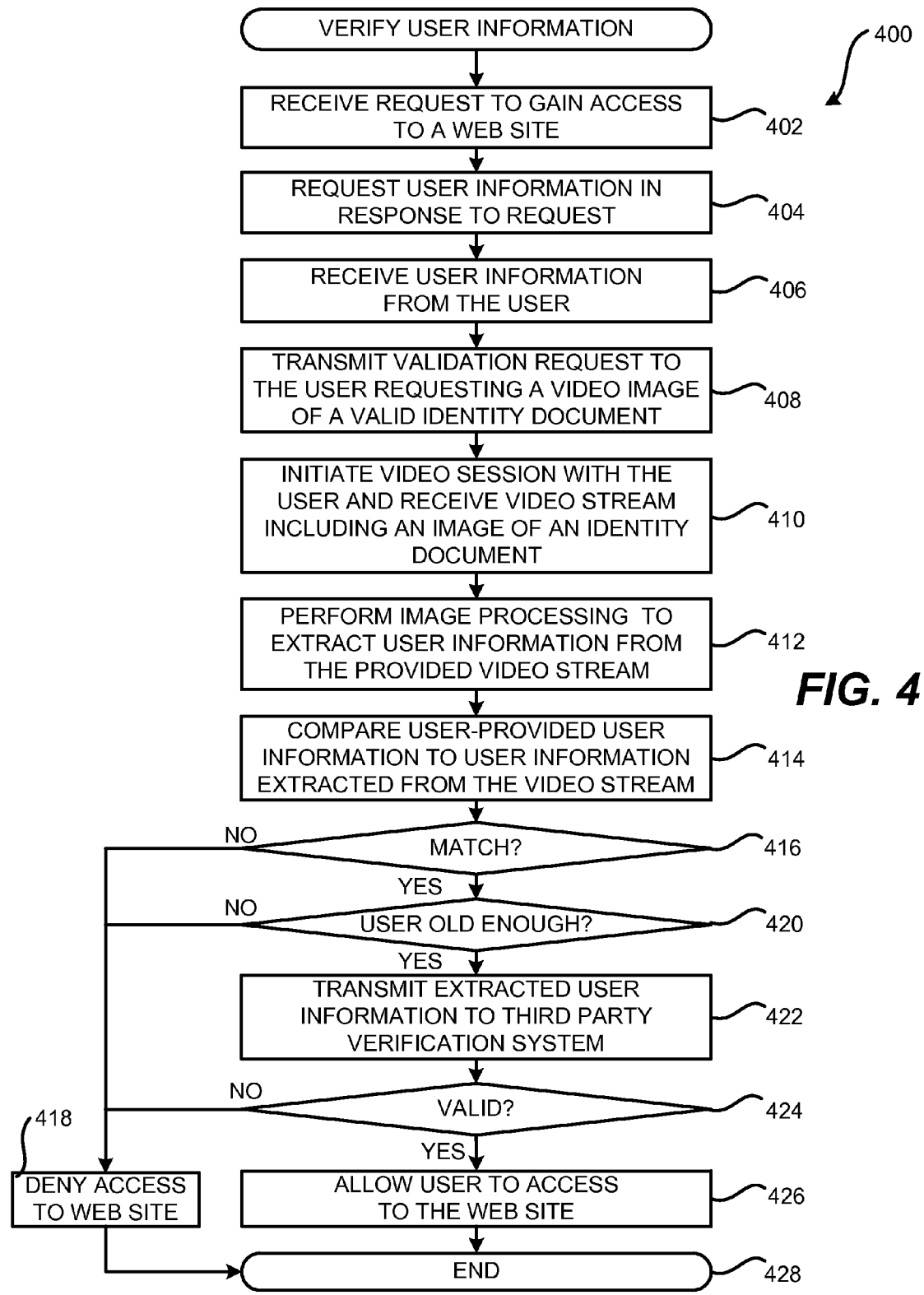
FIG. 4 is a flow diagram illustrating aspects of the mechanism for verifying user information described with reference to FIG. 3.

FIG. 4 is a flow diagram illustrating aspects of the mechanism for verifying user information described with reference to FIG. 3. In particular, FIG. 4 shows a routine 400 that illustrates aspects of the operation of the Web site module 112 for verifying user information according to the embodiment described above with reference to FIG. 3 utilizing a video stream 302.

The routine 400 begins at operation 402, where the Web site module 112 receives a request from a user device 104A to access the Web site provided by the Web site module 112 and the Web site system 108. In response thereto, the Web site module 112 might request that the user 102 provide the user information 122 at operation 404. The Web site module 112 receives the user information 122 at operation 406. As mentioned above, the Web site module 112 may pass the user information 122 to the security module 118 for verification.

In response to receiving the user information 122, the security module 118 causes a validation request 124 to be transmitted to the user 102 at operation 408. In this embodiment, the validation request 124 requests that the user 102 provide a video of a valid identity document 120 that can be utilized to verify the user information 122. At operation 410, a video session is established between the user device 104A and the security module 118. The video stream 302 includes an image of an identity document 120.

At operation 412, the security module 118 performs image processing on the video stream 302 to extract an image from the video stream 302 that includes the identity document 120. As in the embodiment described above with regard to FIGS. 1-2, the security module 118 might utilize information describing the layout and contents of the identity document 120 and other image processing techniques known in the art to perform this operation. The routine 400 then proceeds from operation 412 to operation 414 once the user information has been extracted from an image taken from the video stream 302.

At operation 414, the security module 118 compares the user information 122 provided by the user 102 to the user information extracted from the image of the identity document 120 extracted from the video stream 302. If the information does not match, the routine 400 proceeds from operation 416 to operation 418 where the user 102 is denied access to the Web site provided by the Web site system 108. Alternately, the user 102 may be permitted access to the Web site but the user's access might be restricted in some way.

The routine 400 proceeds from operation 416 to operation 420 if the user information 122 provided by the user 102 matches the user information extracted from the video stream 302. At operation 420, the security module 118 determines whether the user information extracted from the video stream 302 meets the access restrictions imposed by the Web site. For instance, the security module 118 may compute the age of the user 102 based upon a birthdate extracted from the video stream 302 and determine whether the user 102 is old enough to access the Web site. If not, the routine 400 proceeds from operation 420 to operation 418 where the user 102 is denied access to the Web site provided by the Web site system 108 or access might be restricted in some way. If the user 102 meets the access restrictions, the routine 400 proceeds from operation 420 to operation 422.

At operation 422, the security module 118 transmits the user information extracted from the video stream 302 to the third party identity document verification system 128 for verification. Alternately, the security module 118 may transmit a frame of the video stream 302 containing an image of the identity document 120 to the third party identity document verification system 128 for verification. In response thereto, the security module 118 receives an indication as to whether the identity document 120 is valid.

If the third party system 128 indicates that the identity document 120 is not valid, the routine 400 proceeds to operation 418 where the user 102 is denied access to the Web site provided by the Web site system 108 or access might be restricted in some fashion. If the third party system 128 indicates that identity document 120 is valid, the routine 400 proceeds to operation 426, where the user 102 is granted access to the Web site provided by the Web site system 108. The routine 400 then proceeds to operation 428, where it ends.

It should be appreciated that the operations performed by the security module 118 at operations 416, 420, and 424 described above might be performed in combination as described above, or might be performed individually. Other types of verification operations might also be performed. For instance, as discussed above, the user 102 might also be requested to show both themselves (i.e. the user's face) and a valid identity document 120 that includes an image of the user (e.g. a photo identification containing a photo of the user) in the video stream 302. The security module 118 may analyze the video stream 302 to determine if the user 102 is the same person shown in the identity document 120. If not, access to the Web site may be denied to the user 102.

Figure 5:
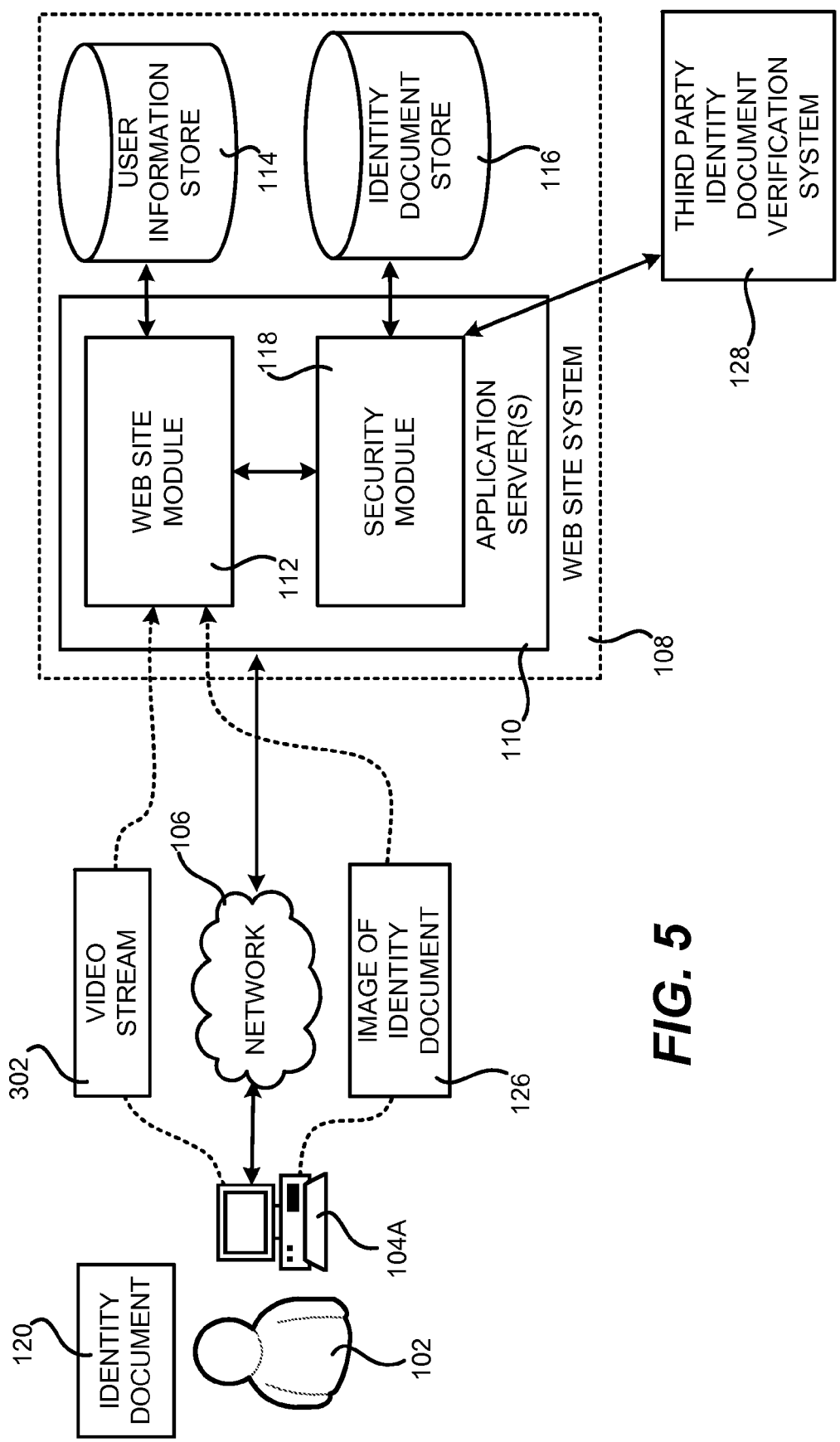
FIG. 5 is a system diagram showing various aspects of yet another mechanism disclosed herein for verifying user information.

FIG. 5 is a system diagram showing various aspects of yet another mechanism disclosed herein for verifying user information. In this embodiment, the user 102 is not requested to provide user information 122. Rather, the user is requested to provide only an image 126 of the identity document 120 or a video stream 302 that includes an image of the identity document 120. In this manner, the user 102 does not need to type their user information 122 at the time access is requested to the Web site provided by the Web site system 108.

In the embodiment shown in FIG. 5, the security module 118 extracts the user information, such as the name of the user 102, the user's address, phone number, birthdate and/or other information from the image 126 or the video stream 302. The security module 118 then verifies the extracted information utilizing various mechanisms, such as the third party identity document verification system 128. If the extracted user information is valid, the security module 118 then determines whether the user 102 meets the access restrictions imposed by the Web site system 108. For instance, the security module 118 might compute the age of the user 102 based upon the extracted and verified birthdate of the user 102 and utilize the computed age to determine if the user 102 is old enough to access the Web site. Additional details regarding this mechanism are provided below with regard to FIG. 6.

Figure 6:
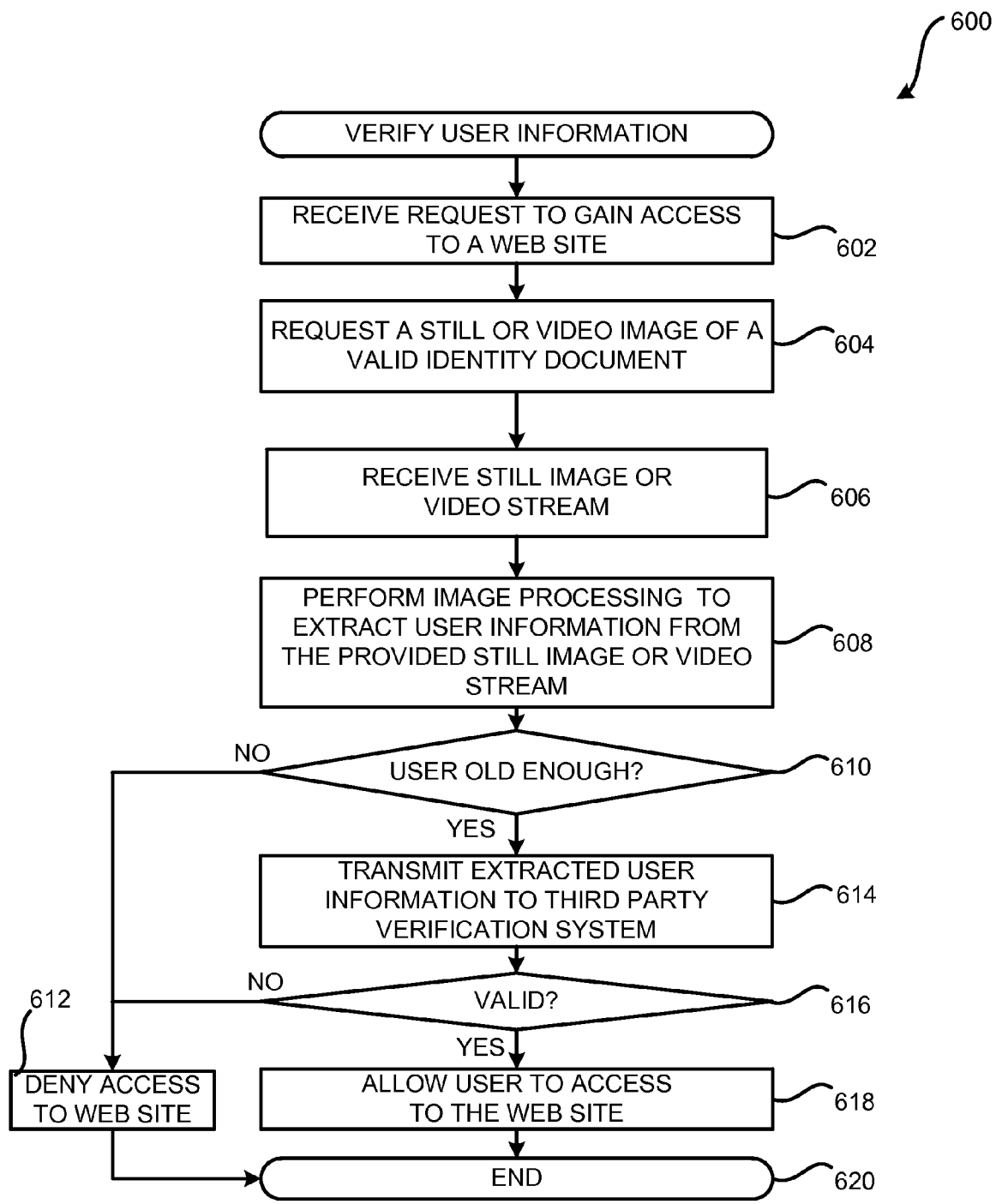
FIG. 6 is a flow diagram illustrating aspects of the mechanism for verifying user information described with reference to FIG. 5.

FIG. 6 is a flow diagram showing a routine 600 that illustrates aspects of the mechanism for verifying user information described with reference to FIG. 5. The routine 600 begins at operation 602, where the Web site module 112 receives a request to access the Web site. In response thereto, the routine 600 proceeds to operation 604, where the Web site module 112 requests a still image 126 or a video stream 302 showing a valid identity document 120 belonging to the user 102.

From operation 604, the routine 600 proceeds to operation 606, where the Web site module 112 receives the image 126 or the video stream 302 and passes the received image 126 or video stream 302 to the security module 118. The security module 118 might also receive the image 126 or video stream 302 directly. In response to receiving the image 126 or the video stream 302, the routine 600 proceeds to operation 608, where the security module 118 performs image processing on the received image 126 or video stream 302 in order to extract user information, such as the user's name, address, birthdate, and/or other user information. Once the user information has been extracted, the routine 600 proceeds from operation 608 to operation 610.

At operation 610, the security module 118 determines whether the extracted user information indicates that the user 102 satisfies the access restrictions imposed by the Web site. For instance, the security module 118 might determine whether the user is old enough to access the Web site based on the user's birthdate extracted from the image 126 or the video stream 302. If the user 102 does not meet the access requirements imposed by the Web site, the routine 600 proceeds from operation 610 to operation 612 where the user 102 is denied access or access to the Web site is granted in a restricted fashion.

If the user 102 meets the access requirements imposed by the Web site, the routine 600 proceeds from operation 610 to operation 614. At operation 614, the security module 118 transmits the user information extracted from the image 126 or the video stream 302 to the third party identity document verification system 128 for verification. Alternately, the security module 118 may transmit the image 126 or a frame of the video stream 302 containing an image of the identity document 120 to the third party identity document verification system 128 for verification. In response thereto, the security module 118 receives an indication as to whether the identity document 120 is valid.

If the third party system 128 indicates that the identity document 120 is not valid, the routine 600 proceeds to operation 612 where the user 102 is denied access to the Web site provided by the Web site system 108 or access might be granted but restricted in some fashion. If the third party system 128 indicates that identity document 120 is valid, the routine 600 proceeds to operation 618, where the user 102 is granted access to the Web site provided by the Web site system 108. The routine 600 then proceeds to operation 620, where it ends.

It should be appreciated that the operations performed by the security module 118 at operations 610, 614, and 616 described above might be performed in combination as described above, or might be performed individually. Other types of verification operations might also be performed. For instance, as discussed above, the user 102 might also be requested to show both themselves (i.e. the user's face) and a valid identity document 120 that includes an image of the user (e.g. a photo identification containing a photo of the user) in the image 126 or video stream 302. The security module 118 may analyze the image 126 or video stream 302 to determine if the user 102 is the same person shown in the identity document 120. If not, access to the Web site may be denied to the user 102.

Figure 7:
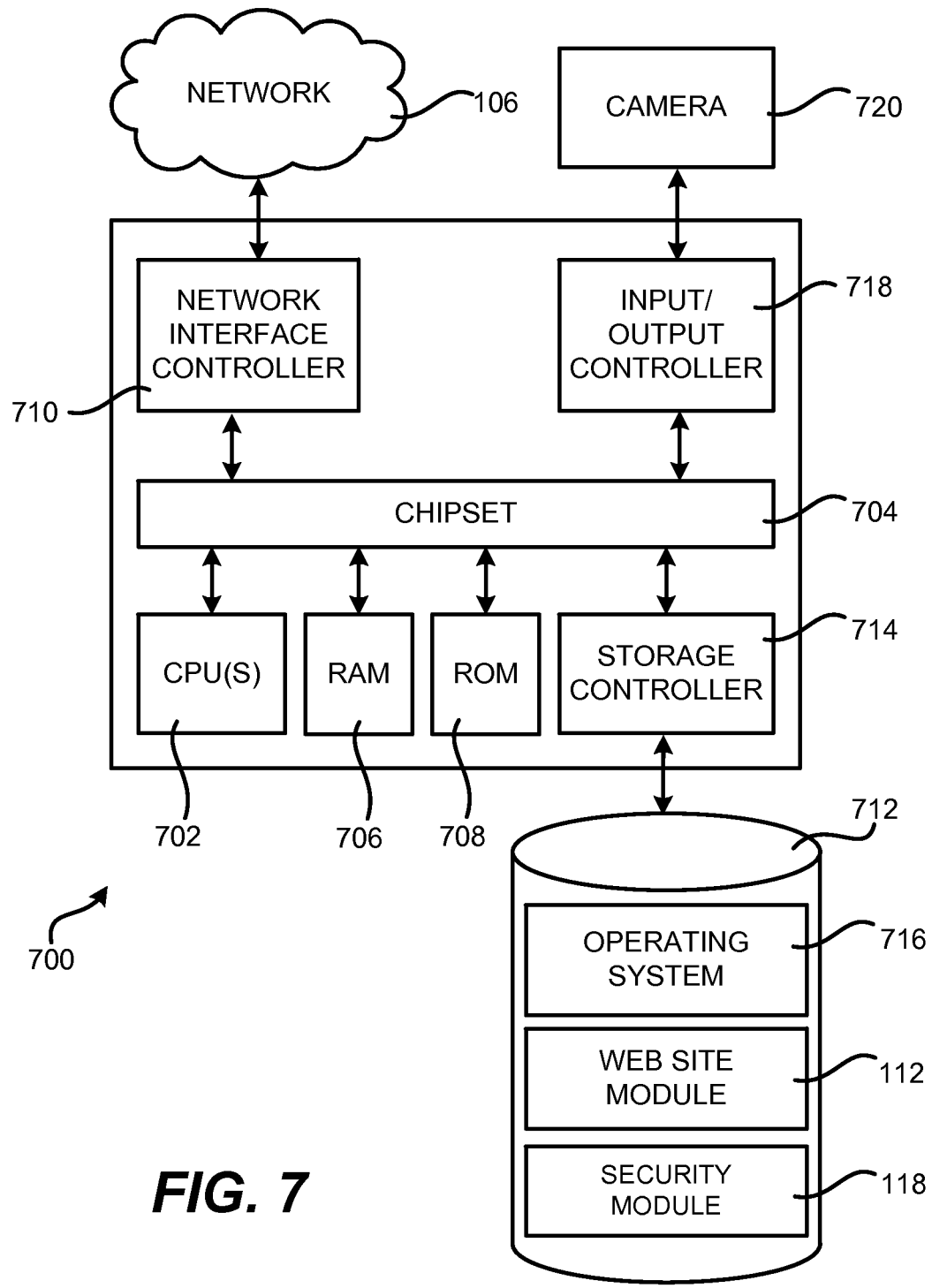
FIG. 7 is a computer architecture diagram showing one illustrative computer hardware architecture for use in computing devices configured to implement the concepts and technologies disclosed herein in one embodiment.

FIG. 7 shows an example computer architecture for a computer 700 capable of executing the software components described herein for verifying user information in the manner presented above. The computer architecture 700 shown in FIG. 7 illustrates a conventional server computer, workstation, desktop computer, laptop, PDA, electronic book reader, digital wireless phone, tablet computer, network appliance, set-top box, or other computing device, and may be utilized to execute any aspects of the software components presented herein described as executing on the application servers 110, the user devices 104A-104B, or other computing platform.

The computer 700 includes a baseboard, or "motherboard," which is a printed circuit board to which a multitude of components or devices may be connected by way of a system bus or other electrical communication paths. In one illustrative embodiment, one or more central processing units ("CPUs") 702 operate in conjunction with a chipset 704. The CPUs 702 are standard programmable processors that perform arithmetic and logical operations necessary for the operation of the computer 700.

The CPUs 702 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, or the like.

The chipset 704 provides an interface between the CPUs 702 and the remainder of the components and devices on the baseboard. The chipset 704 may provide an interface to a random access memory ("RAM") 706, used as the main memory in the computer 700. The chipset 704 may further provide an interface to a computer-readable storage medium such as a read-only memory ("ROM") 708 or non-volatile RAM ("NVRAM") for storing basic routines that that help to startup the computer 700 and to transfer information between the various components and devices. The ROM 708 or NVRAM may also store other software components necessary for the operation of the computer 700 in accordance with the embodiments described herein.

According to various embodiments, the computer 700 may operate in a networked environment using logical connections to remote computing devices and computer systems through a network, such as a local-area network ("LAN"), a wide-area network ("WAN"), the Internet, or any other networking topology known in the art that connects the computer 700 to remote computers. The chipset 704 includes functionality for providing network connectivity through a network interface controller ("NIC") 710, such as a gigabit Ethernet adapter. For example, the NIC 710 may be capable of connecting the computer 700 to other computing devices, such as the application servers 110, the user devices 104A-B, a data storage system in the Web site system 108, and the like, over the network 106 described above in regard to FIG. 1. It should be appreciated that multiple NICs 710 may be present in the computer 700, connecting the computer to other types of networks and remote computer systems.

The computer 700 may be connected to a mass storage device 712 that provides non-volatile storage for the computer. The mass storage device 712 may store system programs, application programs, other program modules, and data, which have been described in greater detail herein. The mass storage device 712 may be connected to the computer 700 through a storage controller 714 connected to the chipset 704. The mass storage device 712 may consist of one or more physical storage units. The storage controller 714 may interface with the physical storage units through a serial attached SCSI ("SAS") interface, a serial advanced technology attachment ("SATA") interface, a FIBRE CHANNEL ("FC") interface, or other standard interface for physically connecting and transferring data between computers and physical storage devices.

The computer 700 may store data on the mass storage device 712 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 712 is characterized as primary or secondary storage, or the like. For example, the computer 700 may store information to the mass storage device 712 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 may further read information from the mass storage device 712 by detecting the physical states or characteristics of one or more particular locations within the physical storage units.

In addition to the mass storage device 712 described above, the computer 700 might have access to other computer-readable media to store and retrieve information, such as program modules, data structures, or other data. It should be appreciated by those skilled in the art that computer-readable media can be any available media that may be accessed by the computer 700, including computer-readable storage media and communications media. Communications media includes transitory signals. Computer-readable storage media includes volatile and non-volatile, removable and non-removable storage media implemented in any method or technology. For example, computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information. Computer-readable storage media does not include transitory signals.

The mass storage device 712 may store an operating system 716 utilized to control the operation of the computer 700. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized. The mass storage device 712 may store other system or application programs and data utilized by the computer 700, such as the Web site module 112 and/or the security module 118, both of which were described above.

In one embodiment, the mass storage device 712 or other computer-readable storage media may be encoded with computer-executable instructions that, when loaded into the computer 700, transform the computer from a general-purpose computing system into a special-purpose computer capable of implementing the embodiments described herein. These computer-executable instructions transform the computer 700 by specifying how the CPUs 702 transition between states, as described above. According to one embodiment, the computer 700 has access to computer-readable storage media storing computer-executable instructions that, when executed by the computer, perform the various routines and operations described herein.

The computer 700 may also include an input/output controller 718 for receiving and processing input from a number of input devices, such as a keyboard, a mouse, a touchpad, a touch screen, an electronic stylus, or other type of input device. Similarly, the input/output controller 718 may provide output to a display device, such as a computer monitor, a flat-panel display, a digital projector, a printer, a plotter, or other type of output device. It will be appreciated that the computer 700 may not include all of the components shown in FIG. 7, may include other components that are not explicitly shown in FIG. 7, or may utilize an architecture completely different than that shown in FIG. 7.

Based on the foregoing, it should be appreciated that technologies for verifying user information have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-implemented method of verifying user information, the computer-implemented method comprising executing instructions in a computing system to perform the operations of:
  receiving a request to access a Web site from a first device associated with a user;
  in response to receiving the request to access the Web site, requesting user information for the user requesting access to the Web site from the first device associated with the user;
  receiving the user information from the first device associated with the user;
  transmitting a validation request to a second device associated with the user in response to the receipt of the user information, the validation request comprising a request for a single image including both an image of the user and an image of a valid identity document associated with the user that includes another image of the user;
  receiving the single image from the second device associated with the user in response to the validation request;
  extracting user information from the image of the identity document contained in the single image;
  extracting a first portion of the single image that includes the image of the user;

extracting a second portion of the single image that includes the image of the identity document that includes the other image of the user;

comparing the extracted first portion to the extracted second portion to determine if the user is represented in the identity document; and granting the request to access the Web site if the received user information corresponds with the user information extracted from the image of the identity document and the user is represented in the identity document.

2. The computer-implemented method of claim 1, wherein the second user device comprises a wireless mobile telephone.

3. The computer-implemented method of claim 1, wherein the user information extracted from the image of the identity document comprises a birthdate.

4. The computer-implemented method of claim 3, wherein the method further comprises:

determining an age of the user based upon the birthdate extracted from the image of the identity document; and granting access to the Web site if the age of the user is greater than a minimum age required to access the Web site.

5. The computer-implemented method of claim 1, wherein the user information extracted from the image of the identity document comprises a geographical location, and wherein the method further comprises determining whether to grant access to the Web site based upon the geographical location.

6. The computer-implemented method of claim 1, further comprising:

transmitting a request to a third party identity document verification system to verify the identity document provided by the user;

receiving an indication from the third party identity document verification system in response to the request to verify whether the identity document provided by the user is valid; and granting access to the Web site if the third party identity document verification system indicates that the identity document provided by the user is valid.

7. A computer-readable storage medium having computer-executable instructions stored thereupon which, when executed by a computer, cause the computer to:

receive a request from a user to access the computer from a first device associated with the user;

in response to the request, transmit a validation request to a second device associated with the user requesting to initiate a single video stream that includes both an image of the user and a separate image of a valid identity document associated with the user;

receive the single video stream in response to the validation request from the second device associated with the user;

extract user information from the image of the identity document in the single video stream, the user information comprising a birthdate;

extract a first portion of the single video stream that includes the image of the user;

extract a second portion of the single video stream that includes another image of the user within the image of the identity document;

compare the extracted first portion to the extracted second portion of the single video stream to determine if the user is represented in the identity document;

determine an age of the user based upon the birthdate extracted from the single video stream; and permit access to the computer by way of the first device associated with the user if the determined age of the user is greater than a minimum age required to access the computer and the user is represented in the identity document.

8. The computer-readable storage medium of claim 7, having further computer-executable instructions stored thereupon which, when executed by the computer, cause the computer to:

request user information from the user in response to receiving the request to access the computer; and permit access to the computer if the user information received from the user matches the user information extracted from the image of the identity document.

9. The computer-readable storage medium of claim 8, having further computer-executable instructions stored thereupon which, when executed by the computer, cause the computer to:

transmit a request to a third party identity document verification system to verify the identity document provided by the user;

receive a response from the third party identity document verification system in response to the request to verify whether the identity document provided by the user is valid, the response indicating whether the identity document is valid or invalid; and permit access to the computer if the third party identity document verification system indicates that the identity document provided by the user is valid.

10. The computer-readable storage medium of claim 8, wherein the computer is configured to provide a Web site and wherein the request received from the user to access the computer comprises a request to access the Web site.

11. A system for verifying user information, the system comprising:

one or more computers configured to receive a request for access from a first device associated with a user requesting access, the request for access comprising user information for the user, request a single still image or video stream comprising a first image of the user and an image of an identity document associated with the user requesting access from a second device associated with the user in response to receiving the user information, receive the single still image or video stream comprising the first image of the user and the image of the identity document from the second device associated with the user, extract the first image of the user from the single still image or video stream, extract user information and a second image of the user from the image of the identity document in the single still image or video stream, and determine whether the request to access the one or more computers should be granted or denied by comparing the user information to the extracted user information and by comparing the first image of the user to the second image of the user to determine if the user is shown in the identity document.

12. The system of claim 11, wherein the extracted user information comprises a birthdate, and wherein utilizing the extracted user information to determine whether the request to access the one or more computers should be granted or denied comprises determining an age of the user requesting access to the one or more computers based upon the birthdate and granting the user access to the one or more computers if the determined age of the user is greater than a minimum age required to access the computers.

13. The system of claim 11, wherein the extracted user information comprises a geographical location.

14. The system of claim 11, wherein the one or more computers are further configured to transmit the user information to a third party identity document verification system for verification.

15. The system of claim 11, wherein the image of the identity document in the single still image or video stream is received by the one or more computers in response to a validation request transmitted to a mobile device associated with the user.

16. The system of claim 15, wherein the one or more computers are configured to provide a Web site and wherein the request to access the one or more computers comprises a request to access the Web site.

* * * * *